United States Patent
Kumar et al.

(10) Patent No.: US 10,074,453 B2
(45) Date of Patent: Sep. 11, 2018

(54) P-TOLUENESULFONATE DOPED POLYPYRROLE/CARBON COMPOSITE ELECTRODE AND A PROCESS FOR THE PREPARATION THEREOF

(71) Applicant: Council of Scientific & Industrial Research, New Delhi (IN)

(72) Inventors: Amit Kumar, New Delhi (IN); Hari Krishna Singh, New Delhi (IN); Rajiv Kumar Singh, New Delhi (IN); Ramadhar Singh, New Delhi (IN); Pankaj Srivastava, Varanasi (IN)

(73) Assignee: Council of Scientific & Industrial Research, New Delhi (IN)

( * ) Notice: Subject to any disclaimer, the term of this patent is extended or adjusted under 35 U.S.C. 154(b) by 27 days.

(21) Appl. No.: 14/464,845

(22) Filed: Aug. 21, 2014

(65) Prior Publication Data

US 2016/0055984 A1    Feb. 25, 2016

(51) Int. Cl.

| | |
|---|---|
| *H01B 1/04* | (2006.01) |
| *H01B 1/12* | (2006.01) |
| *H01G 11/34* | (2013.01) |
| *H01G 11/38* | (2013.01) |
| *H01G 11/48* | (2013.01) |
| *H01G 11/86* | (2013.01) |
| *C09C 1/56* | (2006.01) |
| *H01G 11/32* | (2013.01) |

(52) U.S. Cl.
CPC ............ *H01B 1/127* (2013.01); *C09C 1/565* (2013.01); *H01B 1/04* (2013.01); *H01G 11/32* (2013.01); *H01G 11/34* (2013.01); *H01G 11/38* (2013.01); *H01G 11/48* (2013.01); *H01G 11/86* (2013.01); *Y02E 60/13* (2013.01)

(58) Field of Classification Search
CPC . H01B 1/04; H01B 1/124–1/128; H01B 1/12; H01G 11/32; H01G 11/48; H01G 11/34; H01G 11/36; H01G 11/38; H01G 11/42; H01G 11/86; C09C 1/50; C09C 1/52; C09C 1/54; C09C 1/56; C09C 1/565
USPC .................. 252/500, 502, 510, 511
See application file for complete search history.

(56) References Cited

U.S. PATENT DOCUMENTS

| | | | | |
|---|---|---|---|---|
| 4,636,430 A | * | 1/1987 | Moehwald | ............... C08J 9/405 205/235 |
| 5,143,650 A | * | 9/1992 | Gerace | ..................... C09J 5/00 252/508 |
| 5,378,404 A | * | 1/1995 | Han | ..................... H01B 1/128 252/500 |
| 5,476,612 A | * | 12/1995 | Wessling | ................. C08K 3/08 252/502 |
| 5,498,372 A | * | 3/1996 | Hedges | .................... C08K 9/08 106/472 |
| 6,132,645 A | * | 10/2000 | Hedges | .................... C08K 9/08 252/510 |
| 6,593,399 B1 | * | 7/2003 | La Fleur | ................. H01B 1/127 523/201 |
| 6,842,331 B1 | | 1/2005 | Kazaryan et al. | |
| 7,063,808 B1 | * | 6/2006 | Viswanathan | ......... H01B 1/128 252/500 |
| 7,321,012 B2 | * | 1/2008 | Sotzing | .................. B82Y 30/00 252/500 |
| 7,351,357 B2 | * | 4/2008 | Blanchet-Fincher | ....................... H01B 1/128 252/500 |
| 7,351,358 B2 | * | 4/2008 | Hsu | ......................... C08L 65/00 252/500 |
| 7,515,396 B2 | * | 4/2009 | Biler | .................... H01G 9/0036 29/25.03 |
| 7,737,247 B2 | * | 6/2010 | Stotzing | ................. H01B 1/127 524/817 |
| 8,377,546 B2 | | 2/2013 | Chuang et al. | |

(Continued)

FOREIGN PATENT DOCUMENTS

| | | | | |
|---|---|---|---|---|
| CN | 1280318 C | 10/2006 | | |
| CN | 101302341 A | 11/2008 | | |
| CN | 102051048 A | 5/2011 | | |
| CN | 102779648 A | 11/2012 | | |
| JP | WO 2012117994 A1 | * | 9/2012 | ............. H01G 9/028 |
| WO | WO 2013115596 A1 | * | 8/2013 | ............. C08L 65/00 |

OTHER PUBLICATIONS

H. An et al., "Polypyrrole/carbon aerogel composite materials for supercapacitor," Journal of Power Sources 192, 6964-6969, (2010).

(Continued)

*Primary Examiner* — Harold Pyon
*Assistant Examiner* — Matthew R Diaz
(74) *Attorney, Agent, or Firm* — Locke Lord LLP; Nicholas J. DiCeglie, Jr.

(57) ABSTRACT

Polypyrrole/carbon (PPy/C) composite doped with organic anion p-toluenesulfonate (pTS) is utilized as an electrode in supercapacitor for energy storage application. The surface initiated in-situ chemical oxidative polymerization yields a composite material PPy/C in the presence of varying concentrations of pTS. The novelty of the present invention lies in the doping of PPy/C composite with organic anion pTS and consequent enhancement of its electrochemical activity and stability. The conjugation length and electrical conductivity of pTS doped PPy/C composites increase with the increase in dopant concentration. The pTS doped PPy/C composite synthesized using equimolar concentration (0.1 M) of pTS to pyrrole shows the maximum specific capacitance of ~395 F/g in 0.5 M $Na_2SO_4$ aqueous solution with significant stability ~95% capacitance retention after ~500 cycles.

5 Claims, 5 Drawing Sheets

(56) References Cited

U.S. PATENT DOCUMENTS

| | | | | |
|---|---|---|---|---|
| 2004/0232390 | A1* | 11/2004 | Viswanathan | H01B 1/04 252/500 |
| 2005/0116202 | A1* | 6/2005 | Gao | B41M 5/385 252/500 |
| 2007/0278453 | A1* | 12/2007 | Zahn | C08G 61/122 252/500 |
| 2009/0272946 | A1* | 11/2009 | Lu | H01B 1/04 252/511 |
| 2012/0196062 | A1* | 8/2012 | Sato | F03G 7/005 428/35.2 |
| 2014/0065402 | A1* | 3/2014 | Suckeveriene | H01B 1/24 428/220 |
| 2014/0092529 | A1* | 4/2014 | Nobuta | H01G 9/028 361/527 |
| 2015/0076416 | A1* | 3/2015 | Lee | H01B 1/128 252/500 |

OTHER PUBLICATIONS

K. H. An et al., "High-Capacitance Supercapacitor Using a Nanocomposite Electrode of Single-Walled Carbon Nanotube and Polypyrrole," Journal of the Electrochemical Society, vol. 149, Issue 8, A1058-A1062, (2002).

L. F. Chen et al., "Synthesis of Nitrogen-Doped Porous Carbon Nanofibers as an Efficient Electrode Material for Supercapacitors," ACS Nano, vol. 6, No. 8, 7092-7102, (2012).

A. Kumar et al., "Effect of p-Toluenesulfonate on Inhibition of Overoxidation of Polypyrrole," J. Appl. Polym. Sci. DOI. 10.1002/app.39182 (2013).

A. Kumar et al., "Enhanced capacitance and stability of p-toluenesulfonate doped polypyrrole/carbon composite for electrode application in electrochemical capacitors," Journal of Power Sources 246, 800-807, (2014).

J. R. Miller et al., "Electrochemical Capacitors for Energy Management," Science, vol. 321, 651-652,(2008).

P. Simon et al., "Materials for electrochemical capacitors," Nature Materials, vol. 7, 845-854, (2008).

J. Wang et al., "Electrochemical supercapacitor electrode material based on poly(3,4-ethylenedioxythiophene)/polypyrrole composite," Journal of Power Sources, 163, 1120-1125, (2007).

X. Wang et al., Facile decoration of polypyrrole nanoparticles onto graphene nanosheets for supercapacitors, Synthetic Materials 162, 2349-2354, (2012).

L. Wei et al., "Polypyrrole-Derived Activated Carbons for High-Performance Electrical Double-Layer Capacitors with Ionic Liquid Electrolyte,".

C. Yang et al., "Well-Defined Core-Shell Carbon Black/Polypyrrole Nanocomposites for Electrochemical Energy Storage," ACS Appl. Mater. Interfaces, 3, 1109-1114, (2011).

R. K. Singh et al., "DC Electrical Conduction and Morphological Behavior of Counter Anion-Governed Genesis of Electrochemically Synthesized Polypyrrole Films," Journal of Polymer Science Part B: Polymer Physics 50, 347-360, (2012).

* cited by examiner

P-TOLUENESULFONATE DOPED POLYPYRROLE/CARBON COMPOSITE ELECTRODE AND A PROCESS FOR THE PREPARATION THEREOF

FIELD OF THE INVENTION

The present invention relates to an organic anion doped conducting polymer/carbon composite for electrode applications. Particularly, present invention relates to a process for the preparation of an organic anion doped conducting polymer/carbon composite for electrode applications and a method for the preparation of the same electrode for development of supercapacitor.

More particularly, the present invention relates to a process for the preparation of p-toluenesulfonate (pTS) doped polypyrrole/carbon (PPy/C) composite as an electrode material for supercapacitor. pTS doped PPy/C material has potential for storing charge and can be used in supercapacitor devices.

BACKGROUND OF THE INVENTION

Over the years the increased degree of development has resulted in an ever increasing demand for environment friendly and efficient energy storage systems. Among all the energy storage systems available, supercapacitors (SCs) are high in demand due to their distinctively high power density, reasonable energy density and longer cycle life [M. Winter and R. J. Brodd, Chem. Rev. 104, 4245 (2004); P. Simon and Y. Gogotsi, Nature Mater. 7, 845 (2008); J. R. Miller and P. Simon, Science, 321, 651 (2008)]. Based on the charge storage mechanism, the SCs can be categorized into two groups; electrical double layer capacitors (EDLC) and pseudo-capacitors (PC). In EDLCs the capacitance comes purely from the electrostatic charge accumulation at the electrode/electrolyte interface, which strongly depends on the surface area of the active material. Capacitors based on nanostructured carbon based materials having high surface area, fall under this category. On the other hand, PC or redox supercapacitors use fast and reversible active redox reactions for charge storage. Transition metal oxides ($RuO_2$, $Fe_3O_4$ and $MnO_2$) and electrically conducting polymers are its typical examples. Furthermore, these two mechanisms can simultaneously work together depending upon the nature of the active material.

Conducting polymers, specifically polypyrrole (PPy) has generated wide interest in the area of energy storage owing to its unique features such as high conductivity, environment friendliness, fast charge-discharge kinetics and low cost [L.-Z. Fan and J. Maier, Electrochem. Comm. 8, 937 (2006); H. An et al., J. Power Sources 195, 6964 (2010); B. C. Kim et al., J. Power Sources, 177, 665 (2008); I. Sultana et al., Electrochim. Acta, 60, 201 (2012); J. Wang et al, J. Power Sources, 163, 1120 (2007); J. Wang et al., Synth. Met., 161, 1141 (2011)]. Moreover, its characteristic redox doping-undoping process can be exploited in the charge storage systems, utilizing both the electrochemical double layer at the interface and pseudo-capacitive behavior. Nevertheless, the simultaneous occurrence of swelling and contraction with this doping-undoping process, adversely affects the materials stability, which ultimately affects its long term utilization.

To overcome the above mentioned problematic aspects, PPy has been used together with various carbon materials such as PPy/graphene [Y. Liu et al., Electrochim. Acta, 88, 519 (2013); X. Wang et al., Synth. Met. 162, 2349 (2012); J. Zhang and X. S. Zhao, J. Phys. Chem. C 116, 5420 (2012); CN 102051048 A], PPy/activated carbon [L. Wei et al., Adv. Funct. Mater. 22, 827 (2012)], PPy/carbon aerogel [H. An et al., J. Power Sources, 195, 6964 (2010)], PPy/single walled carbon nanotube [K. H. An et al., J. Electrochem. Soc. 149, A1058 (2002)], PPy/carbon nanofiber [L. F. Chen et al., ACS Nano, 6, 7092 (2012)] and PPy/carbon black [Yang et al., ACS Appl. Mater. Interf., 3, 1109 (2011)], etc. Conductive polymer/carbon material having high conductivity and long cycle life has been reported for various electrochemical storage devices [US008377546B2; US006842331B1; WO 2002019357 A8; CN 101302341 B; CN 1280318 C]. Although most of the porous materials exhibit large capacitance, the electrical conductivity deteriorates due to unavailability of conducting pathways or existence of oxygen containing functional groups [L. Li et al., J. Solid State Electrochem., 15, 175 (2010)] which largely limits the power capacity [L. F. Chen et al., ACS Nano, 6, 7092 (2012)]. Flexible electrode material for supercapacitor has shown a specific capacitance of ~255 F/g [Chinese patent CN 102779648 A]. Recently [C. Yang et al., ACS Appl. Mater. Interf., 3, 1109 (2011)] have demonstrated that a specific capacitance of 366 F/g can be achieved in carbon black/PPy nanocomposites in 1.0 M $NaNO_3$ electrolyte solution. Moreover, high conducting and thermally stable PPy can be synthesized using aromatic dopant anions [D. Lesueur and N. D. Alberola, Synth. Met. 88, 133 (1997); G. R. Mitchell et al., Synth. Met., 26, 247 (1988); I. Carrillo et al., Synth. Met. 162, 136 (2012)]. In a recent investigation [A. Kumar et al., J. Appl. Polym. Sci., 130, 434 (2013)] it has been found that aromatic dopant such as p-toluenesulfonate (pTS) is resistant to overoxidation and therefore can be used in electrode applications.

Hence to overcome the shortcomings of capacitance retention in the conducting polymer/carbon black composites, it is thought worthwhile to modify the polypyrrole-carbon (PPy/C) composites using aromatic dopant p-toluenesulfonate (pTS) [A. Kumar et al., J. Power Sources, 246, 800 (2014)] to obtain a high conducting PPy/C composites with substantial amount of thermal and electrochemical stability.

OBJECTS OF THE INVENTION

The main object of the present invention is to provide a p-toluenesulfonate doped polypyrrole/carbon (PPy/C) composite electrode for supercapacitor.

Another object of the present invention is to provide a process for the preparation of a p-toluenesulfonate doped polypyrrole/carbon (PPy/C) composite electrode for supercapacitor.

Yet another object of the present invention is to provide a p-toluenesulfonate doped polypyrrole/carbon (PPy/C) composite electrode for supercapacitor, which has the unique property of storing large amount of charge carriers in their polyconjugated backbone.

Another object of the invention is to provide organic anion doped conducting polymer/carbon composite.

Yet another object of the invention is to provide process of preparing organic anion doped conducting polymer/carbon composite.

Yet another object of the present invention is to provide a conducting polymer/carbon composite electrode, which is 100% safe and can be readily used for the development of supercapacitor.

SUMMARY OF THE INVENTION

Accordingly, present invention provides an organic anion doped conducting polymer/carbon composite having dc electrical conductivity ($\sigma_{dc}$) ranging between 0.98-6.85 S/cm.

In an embodiment, present invention provides a process for the preparation of an organic anion doped conducting polymer/carbon composite comprising the steps of:
  i. treating Vulcan carbon with 4 to 6 M $HNO_3$ for 2-4 h;
  ii. ultrasonic dispersion of treated Vulcan carbon as obtained in step (i) in water for 50 to 70 min to form a uniform suspension;
  iii. adding 0.1 M distilled pyrrole monomer to the suspension as obtained in step (ii) followed by adding 0.00-0.15 M pTS at temperature in the range of 273-280 K to obtain a solution;
  iv. constantly stirring of reaction solution of step (iii) under inert atmosphere for 30-45 min at ~273-280 K to obtained stirred solution;
  v. adding 10-30 ml of ammonium persulfate (APS) solution (molar ratio of APS:Py 1:1) dropwise to the stirred solution of (iv) with constant stirring for period in the range of 8-12 h to obtain a precipitate;
  vi. filtering and washing of the precipitate obtained from (v) and keeping it in an oven at ~313-353 K for 10-14 h to obtain an organic anion doped conducting polymer/carbon composite.

In another embodiment of the present invention, the washing of resultant precipitate of composite is done by using methanol and water.

In yet another embodiment of the present invention, the inert atmosphere is maintained by using gases selected from nitrogen, argon and helium.

In yet another embodiment of the present invention, said composite is useful for the preparation of electrode for supercapacitor.

Another embodiment of the present invention is an electrode for supercapacitor comprising the organic anion doped conducting polymer/carbon composite.

In yet another embodiment, present invention provides a process for the preparation of electrode using organic anion doped conducting polymer/carbon composite comprising the steps of:
  a. adding 80-90 wt. % organic anion doped conducting polymer/carbon composite and 10-20 wt. % polyvinylidene fluoride (PVDF) in N,N-dimethylformamide (DMF) followed by ultrasonicating for 50 to 60 min to form a uniform slurry;
  b. coating the platinum (Pt) disk working electrode with slurry obtained in step a to covers only the top active surface of the electrode;
  c. drying the electrode in an oven at ~313-353 K for ~30-45 min to obtain the electrode.

In yet another embodiment of the present invention, specific capacitance of the electrode is 395 F/g in 0.5 M $Na_2SO_4$ aqueous solution with 95% capacitance retention after ~500 cycles.

BRIEF DESCRIPTION OF THE DRAWINGS

FIG. 2: Raman spectra of PPy/C composite samples; E1, E2, E3, E4 and E5.

FIG. 3: Room temperature (300K) dc conductivity ($\sigma_{dc}$) of PPy/C composites as a function of dopant (pTS) concentration.

FIG. 4:a) Cyclic voltammogram (CV) curves of (a) synthesized PPy/C composite (E1, E2, E3, E4 and E5) electrodes in 0.5 M $Na_2SO_4$ aqueous solution at 50 mV $s^{-1}$ and (b) sample E5 with increasing scan rate (5-200 mV/s) in 0.5 M $Na_2SO_4$ aqueous solution.

FIG. 5: Specific capacitance of PPy/C composite electrodes; E1, E,2, E3, E4 and E5 (a) at various scan rates (5-200 mV/s) in 0.5 M $Na_2SO_4$ aqueous solution and (b) during the cycle test at 100 mV/s in 0.5 M $Na_2SO_4$ aqueous solution.

FIG. 6: (a) Nyquist plot and (b) the specific capacitance as a function of frequency for PPy/C composite electrodes; E1, E2, E3, E4 and E5.

DETAILED DESCRIPTION OF THE INVENTION

The primary basis of the present invention is to provide a composite of polypyrrole/carbon (PPy/C) doped with an organic dopant anion (p-toluenesulfonate) having the enhanced specific capacitance and capacitance retention ability, which will be useful in the development of composite electrode for supercapacitor.

Accordingly in the present invention the polypyrrole/carbon (PPy/C) composites have been doped with varying concentration of p-toluenesulfonate (pTS) by surface initiated in-situ chemical oxidative polymerization with a purpose to develop an electrode material for supercapacitors.

The influence of pTS on the structure of the composite is observed through Fourier transform infrared (FT-IR) and Raman spectroscopy. EDAX was performed to estimate the S/N ratio. The performance of PPy/C composite electrode for charge storage has been analyzed using electrochemical tools such as cyclic voltammetry and electrochemical impedance spectroscopy. The maximum specific capacitance ~395 F/g in 0.5 M $Na_2SO_4$ aqueous solution with significant stability over 500 cycles is obtained for the material synthesized using equimolar concentration (0.1 M) of pTS to pyrrole (Py).

The method generally used to prepare conducting polymers are i) chemical polymerization in solution, ii) chemical vapour deposition and iii) electrochemical polymerization.

The general scheme for preparation of conducting polymers is oxidative coupling, which involves the oxidation of monomers to form cation radical followed by coupling to form dications and repetition of process to produce a polymer. Oxidative coupling can be done by electrochemical or chemical polymerization process. By selection of suitable oxidant, synthetic medium and monomer, one can perform polymerization process to obtain a desired polymer or polymer composite.

Accordingly the present invention provides a porous conducting polymer encapsulated carbon composite having dc electrical conductivity ranging between 0.98-6.85 S/cm (See the nomenclature of the samples in Table 1), and a process for the preparation of the said conducting polymer/carbon composite which comprises
  i) distilling pyrrole by known methods;
  ii) treatment of Vulcan carbon with 6 M $HNO_3$ for 2-4 h;
  iii) ultrasonic dispersion of treated Vulcan carbon in 100 ml distilled water for ~60 min to form a uniform suspension;
  iv) addition of distilled pyrrole monomer (0.1 M) from (i) to the above mentioned suspension of (iii);

v) temperature of the reaction solution of (iv) was maintained at ~275 K using Julabo low temperature bath FP-50;
vi) constant stirring of reaction solution under inert atmosphere ($N_2$) for ~30 min at ~275 K;
vii) addition of 10-30 ml of ammonium persulfate (APS) (oxidant) solution (molar ratio of APS:Py 1:1) drop-wise to the reaction solution of (iv);
viii) constant stirring of the reaction solution of (vii) for ~8-12 h;
ix) washing the resultant precipitate from (viii) with copious amount of methanol and deionized water to remove any trace amount of impurities;
x) filtration and washing of the precipitate obtained from (ix) and keeping it in an oven at ~313-353 K overnight;
xi) for the synthesis of pTS doped PPy/C composite samples, varying concentration of pTS (0.00-0.15 M) were added with pyrrole monomer prior to addition of oxidant (APS) i.e. before step (vii), keeping the rest of polymerization procedure same. The nomenclature of these synthesized samples is described in Table 1;
xii) PPy/C slurry was made using 80-90 wt. % active material (10 mg) and 10-20 wt. % polyvinylidene fluoride (PVDF) in N,N-dimethylformamide (DMF) and was ultrasonicated for ~60 min to form a uniform suspension;
xiii) the platinum (Pt) disk working electrode was coated with the active material, wherein, a drop of this slurry from (xii) was carefully released on the disk electrode so that it covers only the top active surface of the electrode;
xiv) this electrode was then left to dry in an oven at ~313-353 K for ~30 min;
xv) similar procedure was adopted for making electrodes for other pTS doped PPy/C composites.

Characterization of P-Toluenesulfonate Doped Polypyrrole/Carbon Composites

Fourier transform infrared (FT-IR) of PPy/C composites was performed by IR spectrometer (Cary 630, Agilent Technologies) using Diamond ATR accessory. Raman spectra were recorded using Renishaw Raman Spectrometer, Germany with laser excitation source of 714 nm. The laser power was reduced to 2 mW to avoid destruction of the samples. The dc electrical conductivity ($\sigma_{dc}$) of these PPy/C composites was measured on pressed pellets using collinear four-point probe method. EDAX of the sample was carried out using Zeiss microscope model EVO MA-10 equipped with Oxford INCA EDX microprobe.

EXAMPLES

The following examples are given by way of illustration of the present invention and should not be construed to limit the scope of the present invention:

Example 1

The PPy/C composites were prepared using in-situ chemical oxidative polymerization technique in aqueous medium. The temperature of the reaction solution was maintained at ~2° C. using Julabo low temperature bath FP-50. The Vulcan-carbon was pre-treated with 6 M $HNO_3$ for 2 h prior to PPy/C synthesis. Firstly, 20 wt. % of acid activated Vulcan-carbon was dispersed ultrasonically in 100 ml D.I. water for ~60 min to form a suspension. Subsequently, pyrrole monomer (0.1 M) was added to this reaction solution and was stirred under inert atmosphere ($N_2$) for ~30 min. Then, APS (oxidant) was dissolved in 20 ml D.I. water (molar ratio of APS:Py, 1:1) and added to the reaction solution drop-wise under constant stirring. The polymerization was made to continue under constant stirring for 8 h. This resultant PPy/C composites was then washed with copious amount of methanol and deionized water to remove any trace amount of impurities. Afterwards, the sample was successively filtered and kept overnight (12 h) at ~60° C. in oven. The material thus prepared was named as sample E1.

Example 2

The PPy/C composites were prepared using in-situ chemical oxidative polymerization technique in aqueous medium. The temperature of the reaction solution was maintained at ~2° C. using Julabo low temperature bath FP-50. The Vulcan-carbon was pre-treated with 6 M $HNO_3$ for 2 h prior to PPy/C synthesis. Firstly, 20 wt. % of acid activated Vulcan-carbon was dispersed ultrasonically in 100 ml D.I. water for ~60 min to form a suspension. Subsequently, pyrrole monomer (0.1 M) was added to this reaction solution along with p-toluenesulfonate (0.01 M) and was stirred under inert atmosphere ($N_2$) for ~30 min. Then, APS (oxidant) was dissolved in 20 ml D.I. water (molar ratio of APS:Py, 1:1) and added to the reaction solution drop-wise under constant stirring. The polymerization was made to continue under constant stirring for 8 h. This resultant PPy/C composites was then washed with copious amount of methanol and deionized water to remove any trace amount of impurities. Afterwards, the sample was successively filtered and kept overnight (11 h) at ~60° C. in oven. The material thus prepared was named as sample E2.

Example 3

The PPy/C composites were prepared using in-situ chemical oxidative polymerization technique in aqueous medium. The temperature of the reaction solution was maintained at ~2° C. using Julabo low temperature bath FP-50. The Vulcan-carbon was pre-treated with 6 M $HNO_3$ for 2 h prior to PPy/C synthesis. Firstly, 20 wt. % of acid activated Vulcan-carbon was dispersed ultrasonically in 100 ml D.I. water for ~60 min to form a suspension. Subsequently, pyrrole monomer (0.1 M) was added to this reaction solution along with p-toluenesulfonate (0.03 M) and was stirred under inert atmosphere ($N_2$) for ~30 min. Then, APS (oxidant) was dissolved in 20 ml D.I. water (molar ratio of APS:Py, 1:1) and added to the reaction solution drop-wise under constant stirring. The polymerization was made to continue under constant stirring for 8 h. This resultant PPy/C composites was then washed with copious amount of methanol and deionized water to remove any trace amount of impurities. Afterwards, the sample was successively filtered and kept overnight (12 h) at ~60° C. in oven. The material thus prepared was named as sample E3.

Example 4

The PPy/C composites were prepared using in-situ chemical oxidative polymerization technique in aqueous medium. The temperature of the reaction solution was maintained at ~2° C. using Julabo low temperature bath FP-50. The Vulcan-carbon was pre-treated with 6 M $HNO_3$ for 2 h prior to PPy/C synthesis. Firstly, 20 wt. % of acid activated Vulcan-carbon was dispersed ultrasonically in 100 ml D.I. water for ~60 min to form a suspension. Subsequently, pyrrole monomer (0.1 M) was added to this reaction solution along with p-toluenesulfonate (0.06 M) and was stirred under inert atmosphere ($N_2$) for ~30 min. Then, APS (oxidant) was dissolved in 20 ml D.I. water (molar ratio of APS:Py, 1:1) and added to the reaction solution drop-wise under constant stirring. The polymerization was made to continue under constant stirring for 8 h. This resultant PPy/C composites was then washed with copious amount of methanol and deionized water to remove any trace amount of impurities. Afterwards, the sample was successively filtered and kept overnight (12 h) at ~60° C. in oven. The material thus prepared was named as sample E4.

Example 5

The PPy/C composites were prepared using in-situ chemical oxidative polymerization technique in aqueous medium. The temperature of the reaction solution was maintained at ~2° C. using Julabo low temperature bath FP-50. The Vulcan-carbon was pre-treated with 6 M $HNO_3$ for 2 h prior to PPy/C synthesis. Firstly, 20 wt. % of acid activated Vulcan-carbon was dispersed ultrasonically in 100 ml D.I. water for ~60 min to form a suspension. Subsequently, pyrrole monomer (0.1 M) was added to this reaction solution along with p-toluenesulfonate (0.1 M) and was stirred under inert atmosphere ($N_2$) for ~30 min. Then, APS (oxidant) was dissolved in 20 ml D.I. water (molar ratio of APS:Py, 1:1) and added to the reaction solution drop-wise under constant stirring. The polymerization was made to continue under constant stirring for 8 h. This resultant PPy/C composites was then washed with copious amount of methanol and deionized water to remove any trace amount of impurities. Afterwards, the sample was successively filtered and kept overnight (12 h) at ~60° C. in oven. The material thus prepared was named as sample E5.

Example 6

Preparation of the Electrode

PPy/C slurry was made using 90 wt. % active material (E1 to E5 as prepared in example 1 to 5 respectively) (10 mg) and 10 wt. % polyvinylidene fluoride (PVDF) in N,N-dimethylformamide (DMF) and was ultrasonicated for ~60 min to form a uniform suspension. To coat platinum (Pt) disk working electrode with the active material, a drop of this slurry was carefully released on the disk electrode so that it covers only the top active surface of the electrode. This electrode was then left to dry in oven at 323 K for ~30 min. Similar procedure was adopted in making electrode for other pTS doped samples of PPy/C.

Example 7

Figure 1:
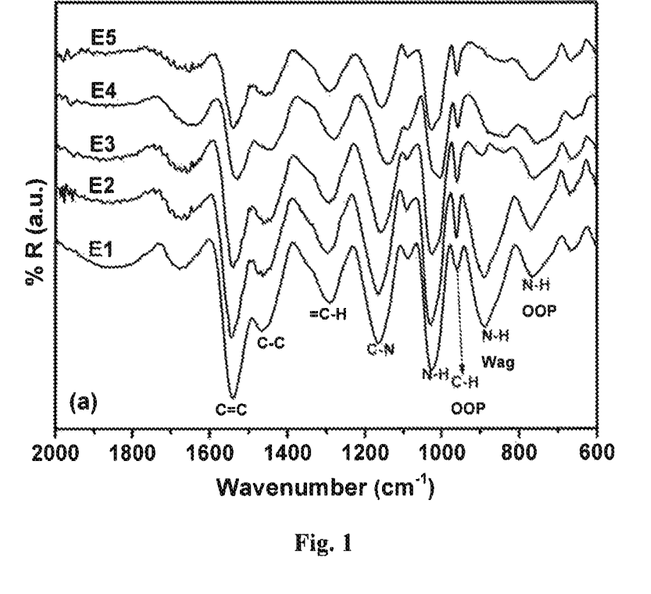
FIG. 1: FTIR of PPy/C composite samples; E1, E2, E3, E4 and E5.
Figure 4A:
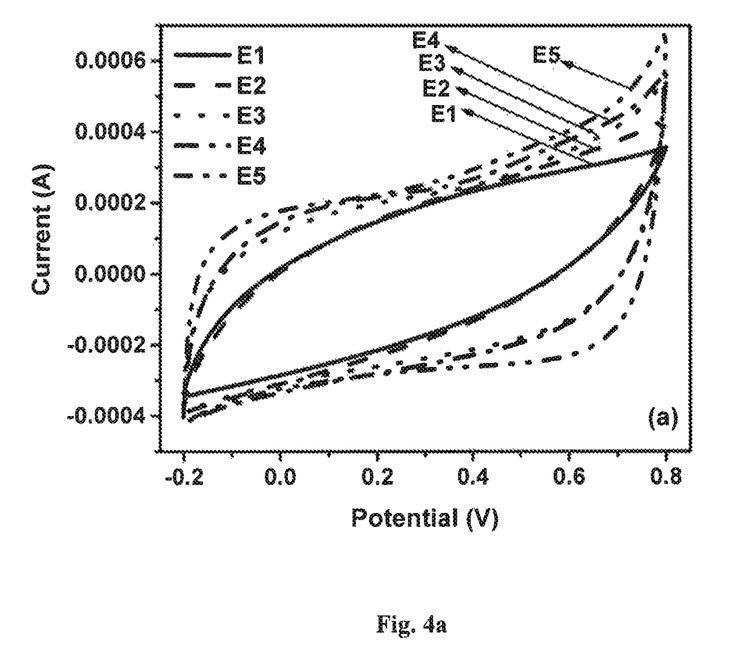
Figure 4B:
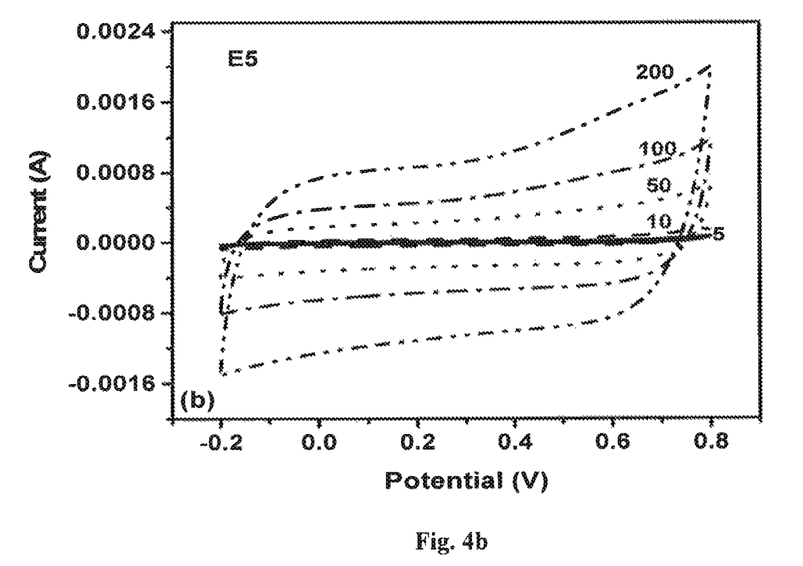
Figure 5A:
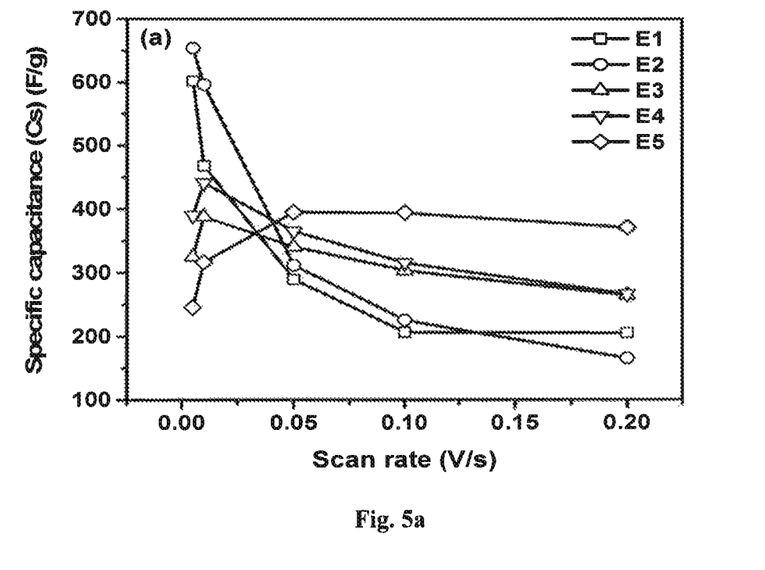
Figure 5B:
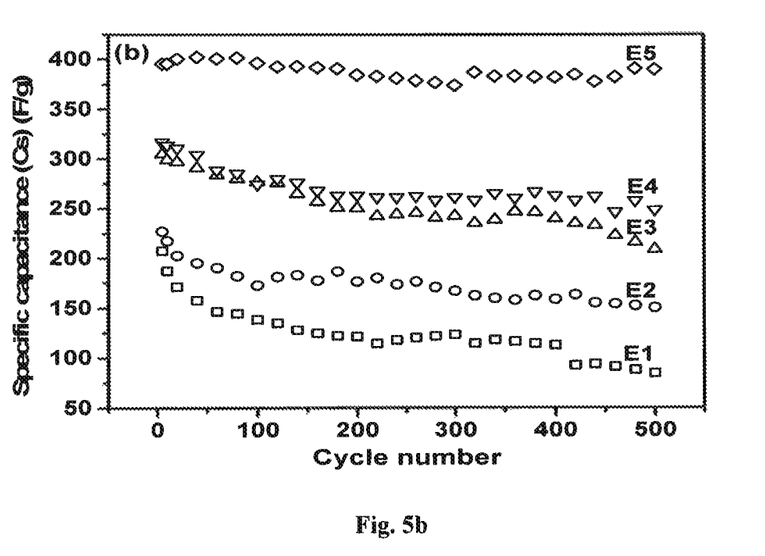
Figure 6A:
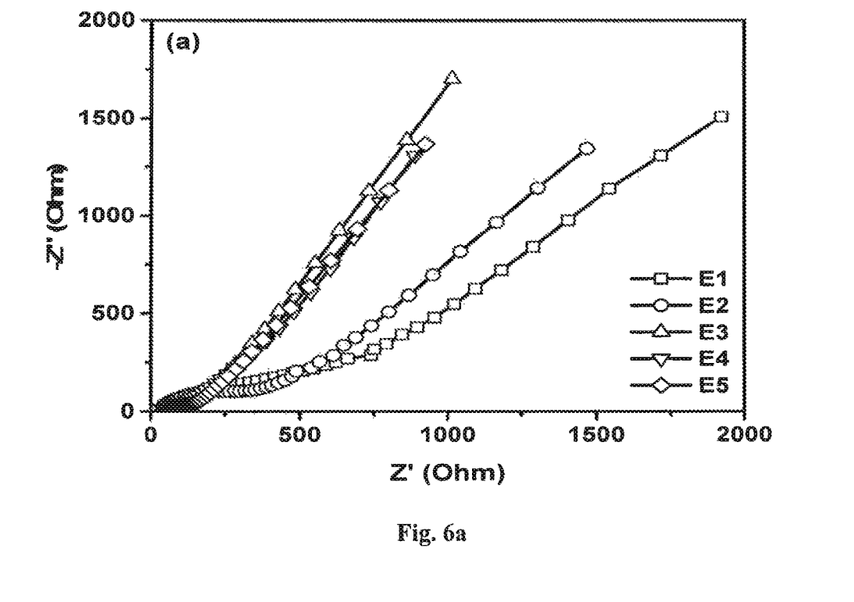
Figure 6B:
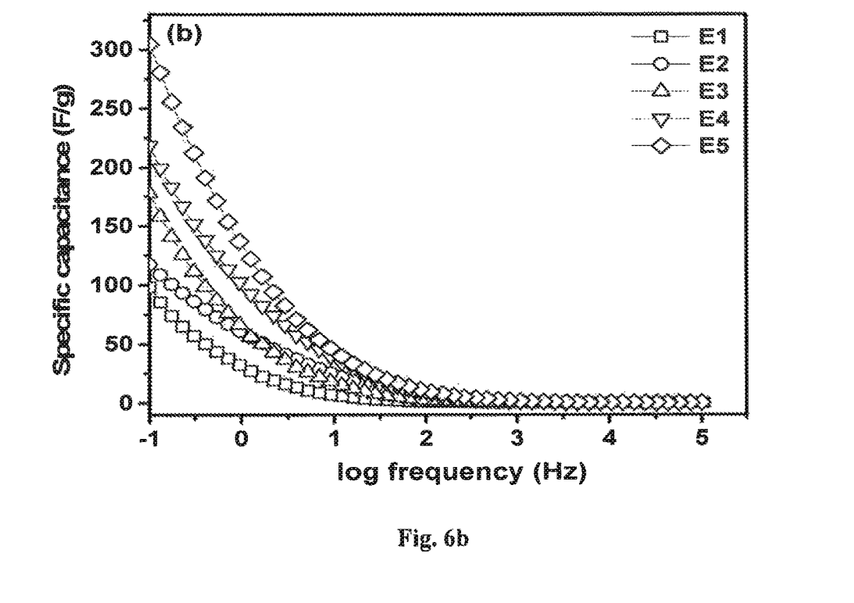

The electrochemical performance of the synthesized electrodes were analyzed using Autolab PGSTAT 302N (Eco Chemie, The Netherlands) operating with computer controlled software NOVA 1.9 at room temperature. The electrolytic cell consists of three electrode one compartment cell having PPy/C modified Platinum (Pt) (area 0.07 $cm^2$), Pt sheet and Ag/AgCl (3 M KCl) as working, counter and reference electrodes, respectively. The electrochemical behavior of the composite samples (E1 to E5) was investigated using cyclic voltammetry in the potential window −0.2 to 0.8 V (vs Ag/AgCl) at various successive scan rates (5-200 mV/s). The electrolyte used for the electrochemical investigation contains 0.5 M $Na_2SO_4$ aqueous solution. The electrochemical impedance spectroscopy was performed in the range 100 kHz to 0.1 Hz at an open circuit potential (OCP) with an equilibrating time of 15 min. Prior to any electrochemical investigation the solution was purged with inert gas ($N_2$) for ~30 min and a slight overpressure of the same was attained during the experiment. It can be seen from FIG. 5(b) that the sample E1 shows decrease in specific capacitance (Cs) from 187 F/g initially to 70 F/g at 500th cycle, however, with increase in dopant concentration (pTS) the specific capacitance of the material is found to improve and is stable for a higher number of cycles. The sample E5 synthesized with an equi-molar concentration (0.1 M) of pTS to pyrrole not only possess high specific capacitance (395 F $g^{-1}$) than other samples but also shows better retentivity of the same, even after 500 cycle at a high scan rate of 100 mV $s^{-1}$.

TABLE 1

Samples nomenclature of polypyrrole/carbon (PPy/C) composites with their respective dopant concentration, room temperature (300K) dc conductivity ($\sigma_{dc}$), conjugation length and S/N ratio.

| Sample Name | Pyrrole (M) | pTS (M) | dc electrical conductivity at 300K ($\sigma_{dc}$) (S/cm) | Conjugation length | S/N ratio | Specific Capacitance ($1^{st}$ cycle) F/g | Specific Capacitance ($500^{th}$ cycle) F/g |
|---|---|---|---|---|---|---|---|
| E1 | 0.10 | 0.00 | 0.98 | 1.38 | — | 187 | 70 |
| E2 | 0.10 | 0.01 | 1.30 | 1.56 | 0.3814 | 226 | 150 |
| E3 | 0.10 | 0.03 | 2.50 | 1.75 | 0.3992 | 305 | 208 |
| E4 | 0.10 | 0.06 | 4.63 | 1.96 | 0.4201 | 318 | 250 |
| E5 | 0.10 | 0.10 | 6.85 | 2.00 | 0.4336 | 395 | 386 |

ADVANTAGES OF THE INVENTION

There has been an ever increasing demand for environment friendly and efficient energy storage systems. Among all the energy storage systems available, supercapacitors are high in demand due to their distinctively high power density, reasonable energy density and longer cycle life.

The main advantages of the present invention are:

The process for the in-situ synthesis of pTS doped PPy/C composite having substantial charge storage ability.

It possesses unique features such as high conductivity, environment friendliness, fast charge-discharge kinetics and can be prepared at low cost.

Moreover, it's characteristic redox doping-undoping process can be exploited in the charge storage systems, utilizing both the electrochemical double layer at the interface and pseudo-capacitive behavior.

An aromatic dopant such as p-toluenesulfonate (pTS) has been found to resist overoxidation and also imparts electrochemical stability to the present PPy/C composites.

We claim:

1. A process for preparing a p-toluenesulfonate (pTS) doped conducting polypyrrole/acid-treated carbon black composite comprising the steps of:
   i) treating carbon black with 6 M $HNO_3$ for 2-4 h;
   ii) ultrasonic dispersion of treated carbon black as obtained in step (i) in water for 50 to 70 min to form a uniform suspension;
   iii) adding 0.1 M distilled pyrrole monomer to the suspension as obtained in step (ii) followed by adding 0.06-0.1 M pTS at temperature in the range of 273-280 K to obtain a solution;
   iv) constantly stirring the solution of step (iii) under inert atmosphere for 30-45 min at 273-280 K to obtain a stirred solution;

v) adding 10-30 ml of ammonium persulfate (APS) solution comprising a molar ratio of ammonium persulfate to pyrrole of 1:1 dropwise to the stirred solution of (iv) with constant stirring for period in the range of 8-12 h to obtain a precipitate;

vi) filtering and washing of the precipitate obtained from (v) and keeping it in an oven at 313-353 K for 10-14 h to obtain a p-toluenesulfonate (pTS) doped conducting polypyrrole/acid-treated carbon black composite.

2. The process for preparing a p-toluenesulfonate (pTS) doped conducting polypyrrole/acid-treated carbon black composite according to claim 1, wherein the washing of the precipitate obtained from (v) comprises washing with methanol and water.

3. The process for preparing a p-toluenesulfonate (pTS) doped conducting polypyrrole/acid-treated carbon black composite according to claim 1, wherein the inert atmosphere comprises a gas selected from the group consisting of nitrogen, argon and helium.

4. A process for preparing an electrode for a supercapacitor comprising the steps of:

i) treating carbon black with 6 M $HNO_3$ for 2-4 h;
ii) ultrasonic dispersion of treated carbon black as obtained in step (i) in water for 50 to 70 min to form a uniform suspension;
iii) adding 0.1 M distilled pyrrole monomer to the suspension as obtained in step (ii) followed by adding 0.06-0.1 M pTS at temperature in the range of 273-280 K to obtain a solution;
iv) constantly stirring the solution of step (iii) under inert atmosphere for 30-45 min at 273-280 K to obtain a stirred solution;
v) adding 10-30 ml of ammonium persulfate (APS) solution comprising a molar ratio of ammonium persulfate to pyrrole of 1:1 dropwise to the stirred solution of (iv) with constant stirring for period in the range of 8-12 h to obtain a precipitate;
vi) filtering and washing of the precipitate obtained from (v) and keeping it in an oven at 313-353 K for 10-14 h to obtain a p-toluenesulfonate (pTS) doped conducting polypyrrole/acid-treated carbon black composite, a) adding 80-90 wt. % of the p-toluenesulfonate (pTS) doped conducting polypyrrole/acid-treated carbon black composite and 10-20 wt. % of a polyvinylidene fluoride (PVDF) in N,N-dimethylformamide (DMF) followed by ultrasonicating for 50 to 60 min to form a uniform slurry;
b) coating a platinum (Pt) disk working electrode with the slurry obtained in step a to cover only a top active surface of the electrode;
c) drying the electrode in an oven at 313-353 K for 30-45 min to obtain the electrode.

5. The process for preparing an electrode according to claim 4, wherein specific capacitance of the electrode is 395 F/g in 0.5 M $Na_2SO_4$ aqueous solution with 95% capacitance retention after 500 cycles.

* * * * *